United States Patent
Bailey et al.

(10) Patent No.: US 8,024,241 B2
(45) Date of Patent: Sep. 20, 2011

(54) COMPUTER-IMPLEMENTED SYSTEMS AND METHODS FOR COST FLOW ANALYSIS

(75) Inventors: Christopher D. Bailey, Cary, NC (US); Dmitry V. Golovashkin, Cary, NC (US)

(73) Assignee: SAS Institute Inc., Cary, NC (US)

( * ) Notice: Subject to any disclaimer, the term of this patent is extended or adjusted under 35 U.S.C. 154(b) by 856 days.

(21) Appl. No.: 11/777,686

(22) Filed: Jul. 13, 2007

(65) Prior Publication Data
US 2009/0018880 A1     Jan. 15, 2009

(51) Int. Cl.
*G06Q 40/00* (2006.01)
(52) U.S. Cl. ............. 705/35; 705/7; 705/10; 705/30; 705/36; 705/37; 707/2; 707/3; 707/6; 709/207; 709/218; 712/10; 345/744; 700/262
(58) Field of Classification Search .......... 705/7, 10, 705/30, 36, 37; 707/2, 3, 6; 709/207, 218; 712/10; 345/744; 700/262
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist et al. | |
| 5,790,847 A | 8/1998 | Fisk et al. | |
| 5,799,286 A | 8/1998 | Morgan et al. | |
| 5,963,910 A | 10/1999 | Ulwick | |
| 5,970,476 A | 10/1999 | Fahey | |
| 6,009,407 A | 12/1999 | Garg | |
| 6,014,640 A * | 1/2000 | Bent | 705/30 |
| 6,029,139 A | 2/2000 | Cunningham et al. | |
| 6,032,123 A | 2/2000 | Jameson | |
| 6,078,892 A | 6/2000 | Anderson et al. | |
| 6,115,691 A | 9/2000 | Ulwick | |
| 6,236,977 B1 | 5/2001 | Verba et al. | |
| 6,237,138 B1 | 5/2001 | Hameluck et al. | |
| 6,275,812 B1 | 8/2001 | Haq et al. | |
| 6,286,005 B1 | 9/2001 | Cannon | |
| 6,321,206 B1 | 11/2001 | Honarvar | |

(Continued)

FOREIGN PATENT DOCUMENTS
WO    0111522    2/2001

OTHER PUBLICATIONS

Balintfy, Joseph L. et al., "Binary and Chain Comparisons with an Experimental Linear Programming Food Price Index", The Review of Economics and Statistics, vol. 52, No. 3, Aug. 1970, pp. 324-330 [JSTOR].

(Continued)

*Primary Examiner* — James Trammell
*Assistant Examiner* — Sanjeev Malhotra
(74) *Attorney, Agent, or Firm* — Jones Day

(57) ABSTRACT

Computer-implemented systems and methods for analyzing costs associated with a cost flow model having components of relationships and entities. A system and method can be configured to receive data associated with the cost flow model that identifies the costs associated with the relationships among the entities. One or more matrices are created that are representative of the costs and the entity relationships. One or more sparse matrix operations are performed upon the created one or more matrices in order to determine cost contribution amounts from an entity to another entity.

26 Claims, 10 Drawing Sheets

U.S. PATENT DOCUMENTS

| | | | |
|---|---|---|---|
| 6,330,552 B1 | 12/2001 | Farrar et al. | |
| 6,490,569 B1 | 12/2002 | Grune et al. | |
| 6,502,077 B1 | 12/2002 | Speicher | |
| 6,526,526 B1 | 2/2003 | Dong et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,735,570 B1 | 5/2004 | Lacy et al. | |
| 6,901,406 B2 | 5/2005 | Nabe et al. | |
| 6,907,382 B2 | 6/2005 | Urokohara | |
| 6,965,867 B1 | 11/2005 | Jameson | |
| 6,970,830 B1 | 11/2005 | Samra et al. | |
| 7,003,470 B1 | 2/2006 | Baker et al. | |
| 7,177,850 B2 | 2/2007 | Argenton et al. | |
| 7,308,414 B2 | 12/2007 | Parker et al. | |
| 7,376,647 B1 | 5/2008 | Guyan et al. | |
| 2001/0014868 A1 | 8/2001 | Herz et al. | |
| 2002/0013757 A1 | 1/2002 | Bykowsky et al. | |
| 2002/0016752 A1* | 2/2002 | Suh | 705/30 |
| 2002/0046078 A1* | 4/2002 | Mundell et al. | 705/10 |
| 2002/0046096 A1 | 4/2002 | Srinivasan et al. | |
| 2002/0072953 A1 | 6/2002 | Michlowitz et al. | |
| 2002/0091909 A1* | 7/2002 | Nakanishi | 712/10 |
| 2002/0107723 A1 | 8/2002 | Benjamin et al. | |
| 2002/0109715 A1* | 8/2002 | Janson | 345/744 |
| 2002/0116237 A1 | 8/2002 | Cohen et al. | |
| 2002/0123930 A1 | 9/2002 | Boyd et al. | |
| 2002/0123945 A1* | 9/2002 | Booth et al. | 705/30 |
| 2002/0147668 A1* | 10/2002 | Smith et al. | 705/30 |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0018503 A1* | 1/2003 | Shulman | 705/7 |
| 2003/0023598 A1 | 1/2003 | Janakiraman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0120651 A1* | 6/2003 | Bernstein et al. | 707/6 |
| 2003/0126010 A1 | 7/2003 | Barns-Slavin | |
| 2003/0149613 A1 | 8/2003 | Cohen et al. | |
| 2003/0182387 A1* | 9/2003 | Geshwind | 709/207 |
| 2003/0208402 A1 | 11/2003 | Bibelnieks et al. | |
| 2003/0208420 A1 | 11/2003 | Kansal | |
| 2003/0220906 A1* | 11/2003 | Chickering | 707/2 |
| 2003/0225660 A1* | 12/2003 | Noser et al. | 705/36 |
| 2003/0236721 A1 | 12/2003 | Plumer et al. | |
| 2004/0073496 A1 | 4/2004 | Cohen | |
| 2005/0131802 A1* | 6/2005 | Glodjo | 705/37 |
| 2005/0171918 A1 | 8/2005 | Eden et al. | |
| 2005/0187917 A1* | 8/2005 | Lawande et al. | 707/3 |
| 2005/0192876 A1* | 9/2005 | McKee, Jr. | 705/30 |
| 2006/0136098 A1* | 6/2006 | Chitrapura et al. | 700/262 |
| 2006/0143042 A1 | 6/2006 | Gragg et al. | |
| 2006/0161637 A1* | 7/2006 | Friess et al. | 709/218 |
| 2006/0253403 A1 | 11/2006 | Stacklin et al. | |
| 2007/0050282 A1 | 3/2007 | Chen et al. | |
| 2007/0226090 A1 | 9/2007 | Stratton | |
| 2008/0065435 A1 | 3/2008 | Ratzloff | |

OTHER PUBLICATIONS

Beamon, Benita M., "Supply chain design and analysis: Models and methods", International Journal of Production Economics, Apr. 15, 1998, pp. 281-294.

Cohen, Marc-david et al., "SAS/OR® Optimization Procedures, with Applications to the Oil Industry," SUGI Proceedings, 1994 (pp. 1-9).

Cokins, Gary et al., "An ABC Manager's Primer Straight Talk on Activity-Based Costing", Institute of Management Accountants, Mar. 9, 1993, pp. 1-40, 63-64.

Cook, Wade D. et al., "Evaluating Suppliers of Complex Systems: A Multiple Criteria Approach", The Journal of the Operational Research Society, vol. 43, No. 11, Nov. 1992 (pp. 1055-1061.

Gilbert, John R. et al., "Sparse Matrices in Matlab: Design and Implementation", SIAM Journal on Matrix Analysis and Applications, pp. 1-24 (1991).

Hollander, Geoffrey, "Model1 deftly parses customer characteristics", InfoWorld, May 25, 1998, vol. 20, No. 21, pp. 1-4, retrieved from: Dialog, file 148.

Horngren, Charles T. et al., "Cost Accounting a Managerial Emphasis", Tenth Edition, Chapter 14, pp. 497-534, 2000.

Johnson, Ellis L. et al., "Recent Developments and Future Directions in Mathematical Programming", IBM Systems Journal, vol. 31, No. 1, 1992, pp. 79-93 [DIALOG: file 15].

Kearney, Trevor D., "Advances in Mathematical Programming and Optimization in the SAS System," SUGI Proceedings, 1999 (12 pp.).

Lee, Eon-Kyung et al., "An effective supplier development methodology for enhancing supply chain performance," ICMIT 2000, pp. 815-820.

Lee, Eon-Kyung et al., "Supplier Selection and Management System Considering Relationships in Supply Chain Management", IEEE Transactions on Engineering Management, vol. 48, No. 3, Aug. 2001, pp. 307-318.

Manchanda, Puneet et al., "The 'Shopping Basket': A Model for Multi-category Purchase Incidence Decisions", Marketing Science, vol. 18, No. 2, 1999, pp. 95-114 [JSTOR].

Medaglia, Andres L., "Simulation Optimization Using Soft Computing", dissertation for Operations Research Department at North Carolina State University, Jan. 24, 2001 (2 pp.).

Porter-Kuchay, Suzanne, "Multidimensional Marketing", Target Marketing, Jan. 2000 [DIALOG: file 13].

Rosen, Michele, "There's Gold in That There Data", Insurance & Technology, Dec. 1998, vol. 23, No. 12, pp. 1-6, retrieved from: Dialog, file 16.

Saarenvirta, Gary, "Data Mining to Improve Profitability", CMA Magazine, vol. 72, No. 2, Mar. 1998, pp. 8-12 [DIALOG: file 15].

Samudhram, Ananda, "Solver setting for optimal solutions", New Strait Times, Nov. 22, 1999 (3 pp.).

Spiegelman, Lisa L., "Optimizers Assist in Specialized Marketing Efforts", Computer Reseller News, Nov. 22, 1999 [PROQUEST].

Data Mining News, Looking Past Automation, MarketSwitch Focuses on Optimization of Marketing Campaigns, Data Mining News, May 10, 1999 [GOOGLE].

Model1 by Group 1 Software, www.g1.com, Aug. 29, 1999 [retrieved Dec. 21, 2005], pp. 1-16, retrieved from: Google.com and archive.org.

SAS Institute Inc., Data Mining, www.sas.com, Jan. 29, 1998 [retrieved Dec. 22, 2005], pp. 1-28, retrieved from: Google.com and archive.org.

"I2 Technologies: i2 releases i2 Five.Two—The complete platform for dynamic value chain management; Flexible, intuitive, powerful solutions designed to help companies gain efficiencies and drive revenue", M2 Presswire, Oct. 25, 2001 (4 pp.).

"Perfect and Open Ratings Form Alliance to Provide Critical Supplier Performance Ratings to Private Exchanges and Net Markets", Business Wire, Oct. 30, 2000 (3 pp.).

"Unica Releases Model 1 Enterprise Edition", Business Wire, Oct. 29, 1998 [retrieved Dec. 22, 2005, pp. 1-3, retrieved from: Proquest Direct.

* cited by examiner

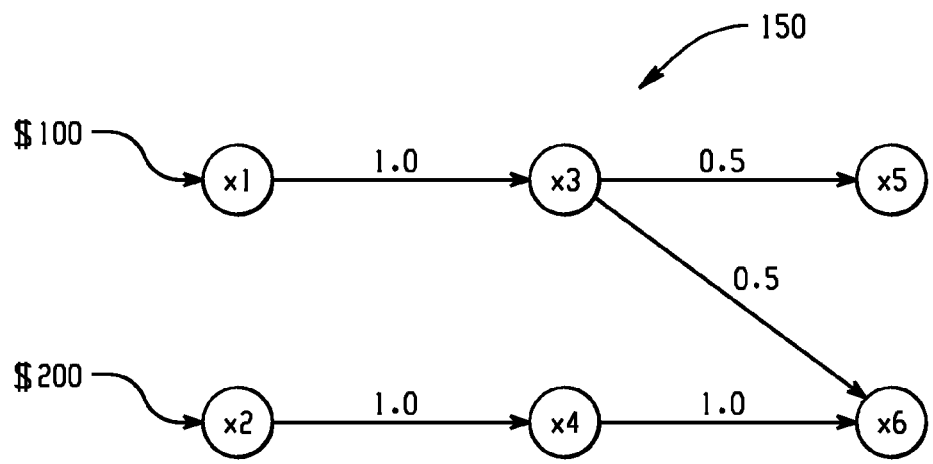
Fig. 4
$$\begin{bmatrix} 1 & 0 & 0 & 0 & 0 & 0 \\ 0 & 1 & 0 & 0 & 0 & 0 \\ -1 & 0 & 1 & 0 & 0 & 0 \\ 0 & -1 & 0 & 1 & 0 & 0 \\ 0 & 0 & -0.5 & 0 & 1 & 0 \\ 0 & 0 & -0.5 & -1 & 0 & 1 \end{bmatrix} \begin{bmatrix} x_1 \\ x_2 \\ x_3 \\ x_4 \\ x_5 \\ x_6 \end{bmatrix} = \begin{bmatrix} 100 \\ 200 \\ 0 \\ 0 \\ 0 \\ 0 \end{bmatrix}$$
Fig. 5
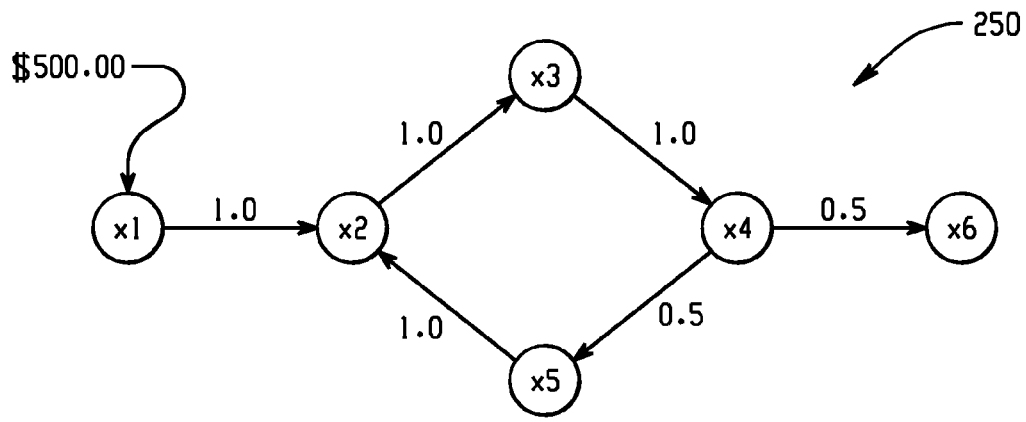
Fig. 6

$$\begin{bmatrix} 1 & 0 & 0 & 0 & 0 & 0 \\ -1 & 1 & 0 & 0 & -1 & 0 \\ 0 & -1 & 1 & 0 & 0 & 0 \\ 0 & 0 & -1 & 1 & 0 & 0 \\ 0 & 0 & 0 & -0.5 & 1 & 0 \\ 0 & 0 & 0 & -0.5 & 0 & 1 \end{bmatrix} \begin{bmatrix} x_1 \\ x_2 \\ x_3 \\ x_4 \\ x_5 \\ x_6 \end{bmatrix} = \begin{bmatrix} 500 \\ 0 \\ 0 \\ 0 \\ 0 \\ 0 \end{bmatrix}$$

COMPUTER-IMPLEMENTED SYSTEMS AND METHODS FOR COST FLOW ANALYSIS

CROSS-REFERENCE TO RELATED APPLICATIONS

This application contains subject matter that may be considered related to subject matter disclosed in U.S. patent application Ser. No. 11/510,527 (entitled "Computer-implemented systems and methods for reducing cost flow models" and filed on Aug. 25, 2006) and to U.S. patent application Ser. No. 11/370,371 (entitled "Systems and methods for costing reciprocal relationships" and filed on Mar. 8, 2006), of which the entire disclosures (including any and all figures) of these applications are incorporated herein by reference.

TECHNICAL FIELD

This document relates generally to computer-implemented cost analysis and more particularly to computer-implemented cost analysis that use cost flow models.

BACKGROUND

A cost flow model, such as an activity-based cost and management (ABC/M) model, is a multi-dimensional directed graph. It depicts how money flows in an enterprise. The nodes in the graph represent the resource, activity, or cost object accounts. The edges in the graph have a percentage on them, which defines how much money flows from a source account to a destination account.

For example in a company, money may flow through many paths, and the linkage between origin and destination can therefore become murky. Activity-based costing and management (ABC/M) systems show the flow, and can compute multi-stage partial contributions from any resource to any cost object. Graphs modeling such systems can easily have hundreds of thousands of accounts and millions of edges. Existent ABC/M systems are based on path enumeration algorithms, however, as the number of paths grows, the feasibility of "walking all paths" is significantly reduced. Following all paths is also problematic when there are cycles within the flow (reciprocal allocation models).

SUMMARY

In accordance with the teachings provided herein, systems and methods for operation upon data processing devices are provided for analyzing costs associated with a cost flow model having components of relationships and entities. As an illustration, a system and method can be configured to receive data associated with the cost flow model that identifies the costs associated with the relationships among the entities. One or more matrices are created that are representative of the costs and the entity relationships. One or more sparse matrix operations are performed upon the created one or more matrices in order to determine cost contribution amounts from an entity to another entity. The determined cost contribution amounts for each of the entities are provided such as providing to a user or an external system.

As another illustration, a system and method can be configured based on solving a sparse system of linear equations that calculates activity based cost flow in real time, as compared to the hours, weeks, etc. as needed by current state of the art solutions. In this illustration, the system and method is neither dependent on the number of paths in a model nor the presence of reciprocal accounts (cycles). In this example, the system and method depends on the number of accounts (nodes) and edges. In addition, the system and method does not require reading and writing a significant amount of information to external storage, such as a hard drive.

BRIEF DESCRIPTION OF THE DRAWINGS

FIG. 4 depicts a forward contribution on a Directed Acyclic Graph (DAG).

FIG. 5 depicts a system of equations representative of the graph on FIG. 4.

FIG. 6 depicts a reciprocal allocation model.

DETAILED DESCRIPTION

Figure 1:
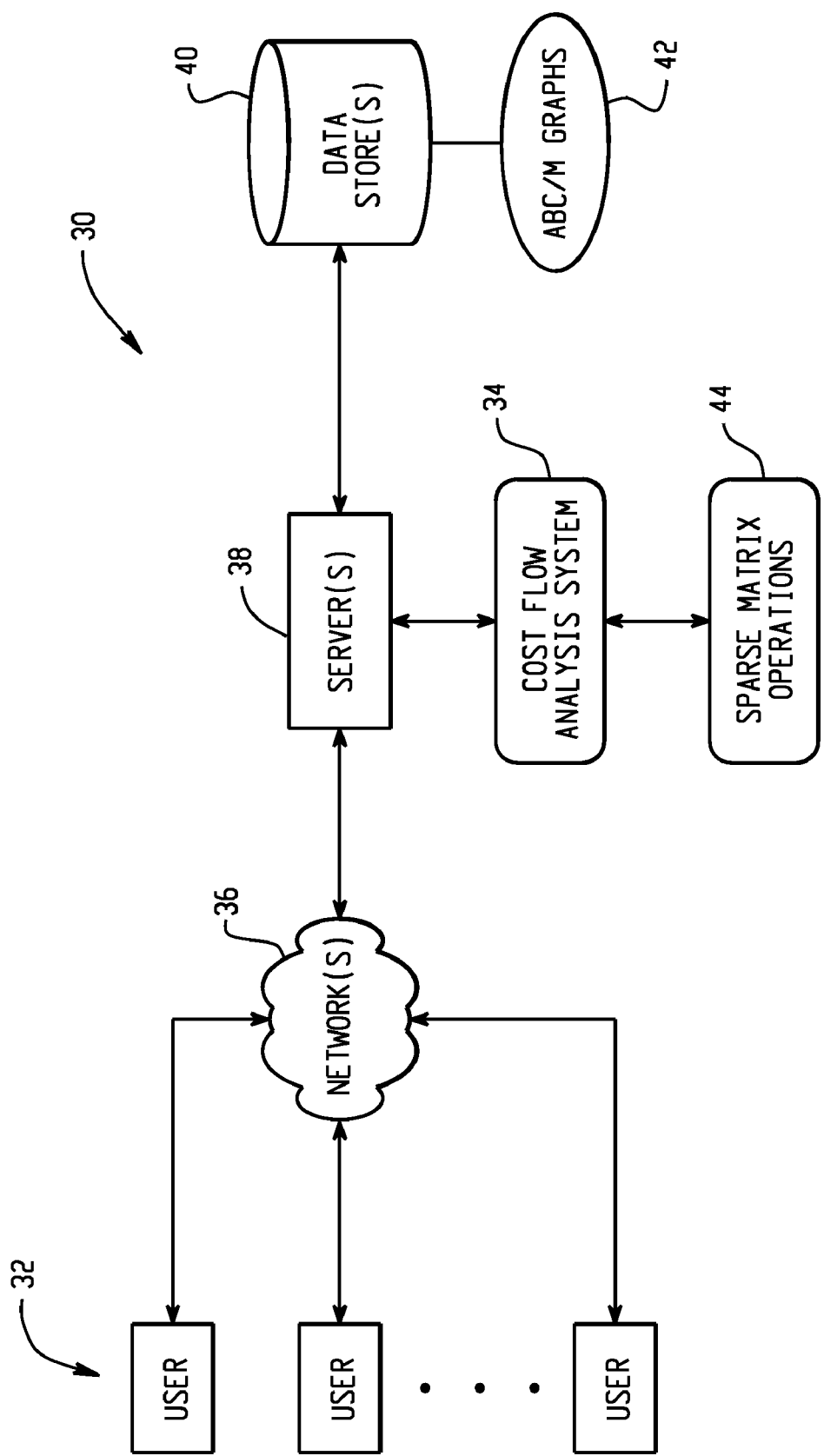
FIG. 1 is a block diagram depicting a computer-implemented environment wherein users can interact with a cost flow analysis system.

FIG. 1 depicts at 30 a computer-implemented environment wherein users 32 can interact with a cost flow analysis system 34. The system 34 accesses software operations or routines 44 in order to solve a sparse system of linear equations that calculates activity based cost flow in real time. This is in contrast to a typical system which would take a greater amount of time.

The users 32 can interact with the cost flow analysis system 34 through a number of ways, such over one or more networks 36. A server 38 accessible through the network(s) 36 can host the cost flow analysis system 34. It should be understood that the cost flow analysis system 34 could also be provided on a stand-alone computer for access by a user.

The cost flow analysis system 34 can be an integrated web-based reporting and analysis tool that provides users flexibility and functionality for performing cost flow determinations and analysis. One or more data stores 40 can store the data to be analyzed by the system 34 as well as any intermediate or final data generated by the system 34. For example, data store(s) 40 can store the data representation of cost flow graph(s) 42 (e.g., the data associated with the cost flow model that identifies the costs associated with the relationships among the entities as well as one or more matrices that are representative of the costs and the entity relationships). Examples of data store(s) 40 may include relational database management systems (RDBMS), a multi-dimensional database (MDDB), such as an Online Analytical Processing (OLAP) database, etc.

Figure 2:
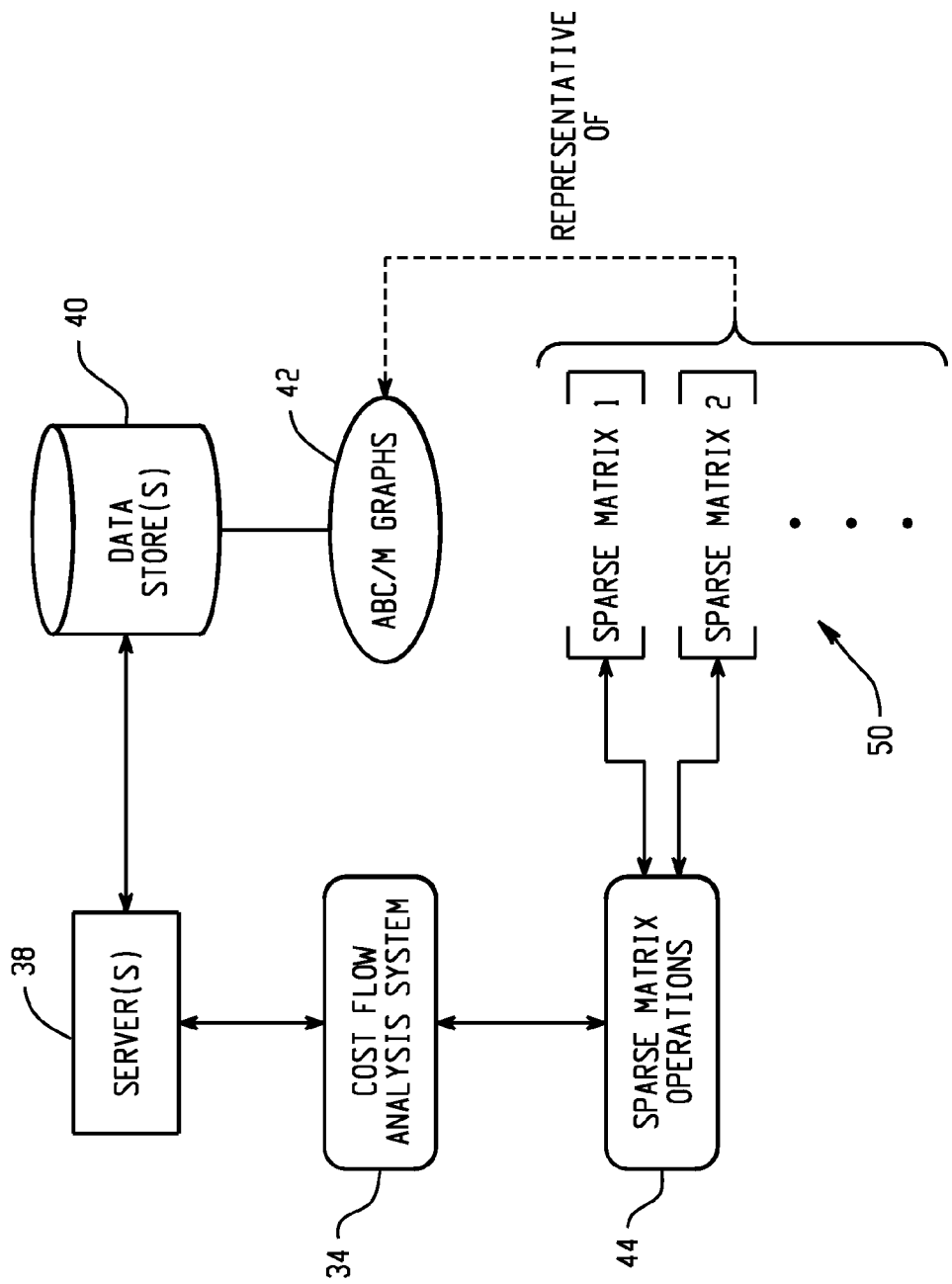
FIG. 2 is a block diagram depicting that one or more sparse matrices are operated upon by sparse matrix operations.

FIG. 2 illustrates that the one or more sparse matrices 50 are operated upon by sparse matrix operations 44. The matrices 50 are a representation of the ABC/M graphs 42 in the form of linear equations that calculates activity based cost flow for the graphs 42. An example of a sparse matrix is a matrix for which only or primarily non-zero components are stored.

Figure 3:
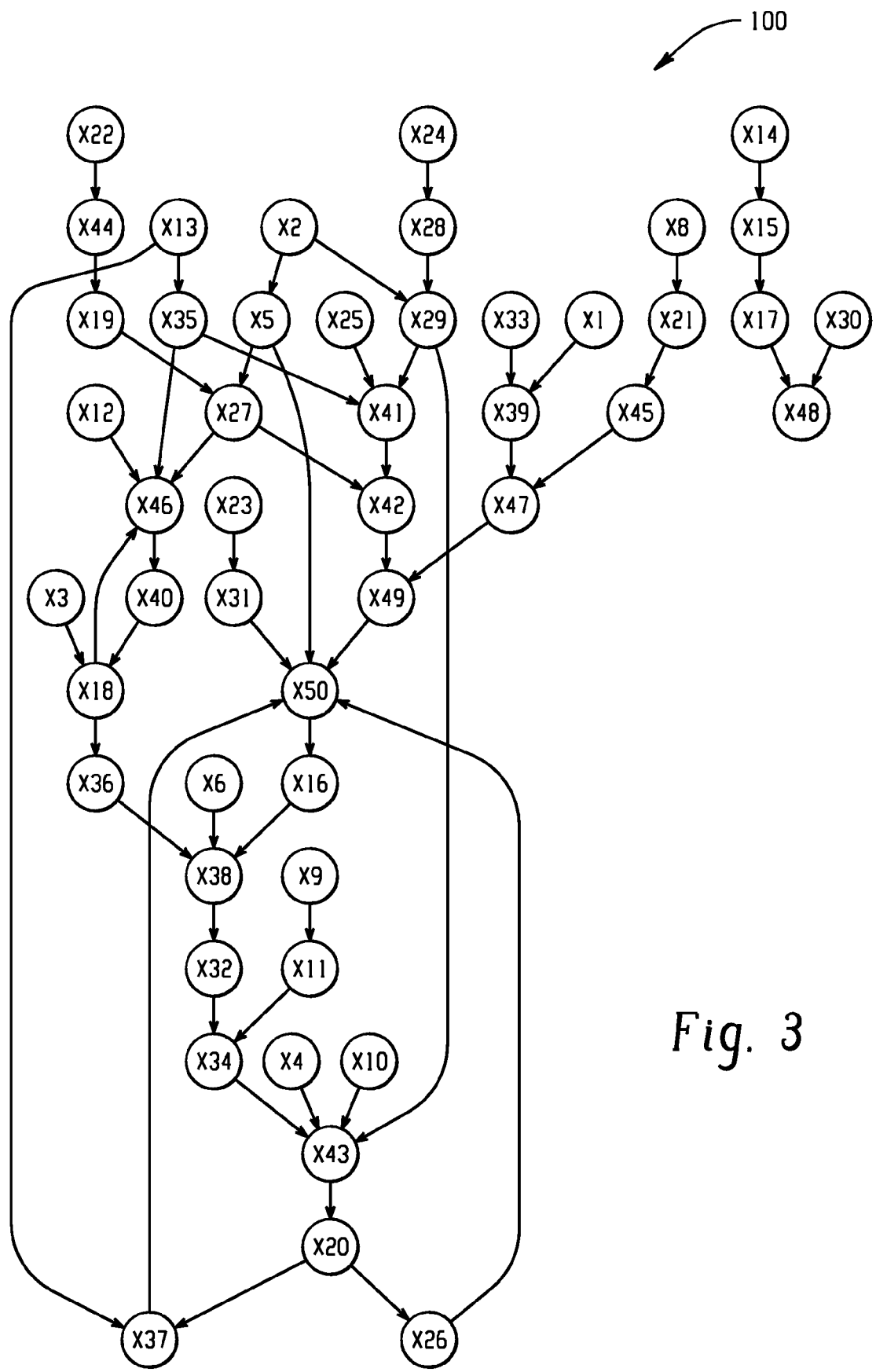
FIG. 3 illustrates the complexity that a cost flow graph can assume.

FIG. 3 illustrates the complexity that a cost flow graph can assume. In the example of FIG. 3, the cost flow graph 100 is a costing model that allocates costs (e.g., expenses, profits, budgets, capital, assets, property, etc.) to various entities (e.g., nodes on the graph that represent cost pools) that comprise a concern (e.g., a business). The costing model can accomplish this based upon such inputs as entity data, relationship data, and cost data.

The entity data can represent any number of entities, including, but not limited to, cost pools such as activity-based cost pools, process-based cost pools, and other logical groupings of money. The cost data can represent the money allocated (or to be allocated) to a particular cost pool. It should be understood that the term cost is used broadly to cover a range of possible uses of money and/or other property. For example, cost data can in some instances refer to budgeting where an actual expense does not yet exist. The relationship data includes information regarding which relationship(s) a particular entity has with another entity. Each relationship has a percentage to indicate that amount of cost that flows from a particular entity to one or more other entities.

When restating an ABC/M graph as a matrix, the assignment from node a to node b can be restated as b=a, which can then be solved as a system of linear equations. In this particular case, because of the nature of cost flow, partitioning and solving the matrix lends itself well to parallelization. An ABC/M graph can assume different forms. For example, FIG. 4 depicts at 150 a forward contribution on a Directed Acyclic Graph (DAG), and FIG. 6 depicts at 250 a contribution with reciprocals/cycles (with some flows possibly being inflated because of potential self-contribution via a cycle).

With respect to FIG. 4, nodes $x_1$ and $x_2$ can be considered as sponsors, they are seeded with $100.00 and $200.00 dollars correspondingly:

$$x_1=100.00$$

$$x_2=200.00$$

Node $x_1$ contributes 100% of its money to $x_3$ node $x_2$ contributes 100% to $x_4$. The corresponding equations are as follows:

$$x_3=x_1$$

$$x_4=x_2$$

Node $x_3$ contributes 50% of its money to $x_5$, and the remaining 50% to $x_6$; node $x_6$ also gets 100% of $x_4$ money:

$$x_5=0.5x_3$$

$$x_6=x_4+0.5x_3$$

We can rewrite the above equations as shown at 200 in FIG. 5. We observe that the resultant matrix is nonsingular (unit main diagonal) lower triangular. Therefore a forward substitution algorithm with either sparse or dense right-hand-sides is sufficient to solve for x. The forward substitution algorithm gives us total (cumulative) flows on all the nodes. While this information is valuable, more information can be obtained. For instance, additional information can be obtained about how much of $x_2$ money (of $200.00) ended up in node $x_5$. Indeed, ABC/M users are interested in a contribution from a subset of nodes (say $x_2$ and $x_3$) to another subset of nodes (say $x_6$ and $x_4$).

FIG. 6 depicts at 250 a type of ABC/M graph that is known as a reciprocal allocation models (e.g., a model with cycles). A system of linear equations corresponding to the graph 250 of FIG. 6 is shown at 300 in FIG. 7. In general, reciprocal relationships occur where two entities have obligations to each other. For example, a business may be composed of several departments, including, but not limited to, human resources, information technology, maintenance, test, and assembly. The human resources department provides services to each of the other departments. Similarly, the information technology and maintenance departments provide services to each of the other departments. The human resources, information technology, and maintenance departments all have reciprocal relationships and expenses are assigned both ways between each of these entities. In this example, the amount of service provided to a department determines how much expense is allocated from the servicing department to the receiving department. It should also be understood that some reciprocal relationships are indirect. For example, entity A may assign costs to entity B, which assigns costs to entity C, which assigns costs to entity A.

Figures 7, 8:
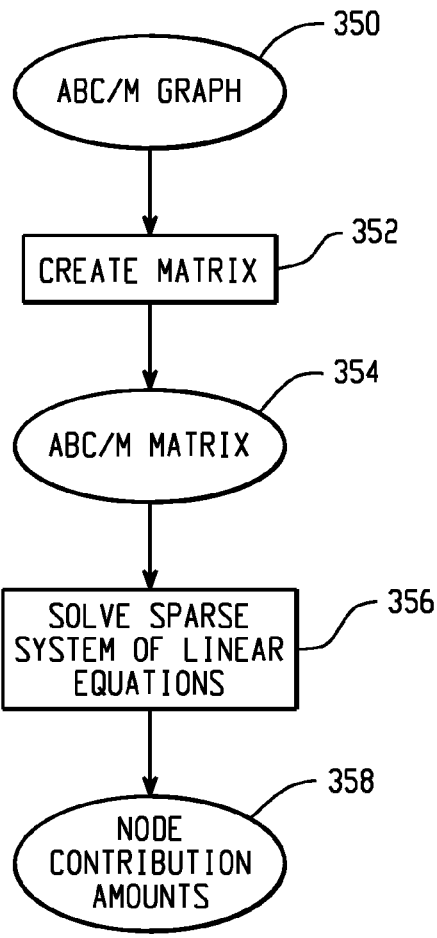
FIG. 7 depicts a system of equations representative of the graph on FIG. 6.
FIG. 8 is a flowchart depicting an operational scenario for processing an ABC/M graph.

FIG. 8 depicts processing of an ABC/M graph 350 in order to determine node contribution amounts 358. At step 352, a matrix 354 is created from the ABC/M graph 350. The system of linear equations contained in matrix 354 is then solved at step 356 using sparse matrix operations in order to determine contribution amounts 358 for the nodes of the ABC/M graph 350. The results can be provided to a user and/or an external system (e.g., a system to further analyze the contribution amounts).

Figure 9:
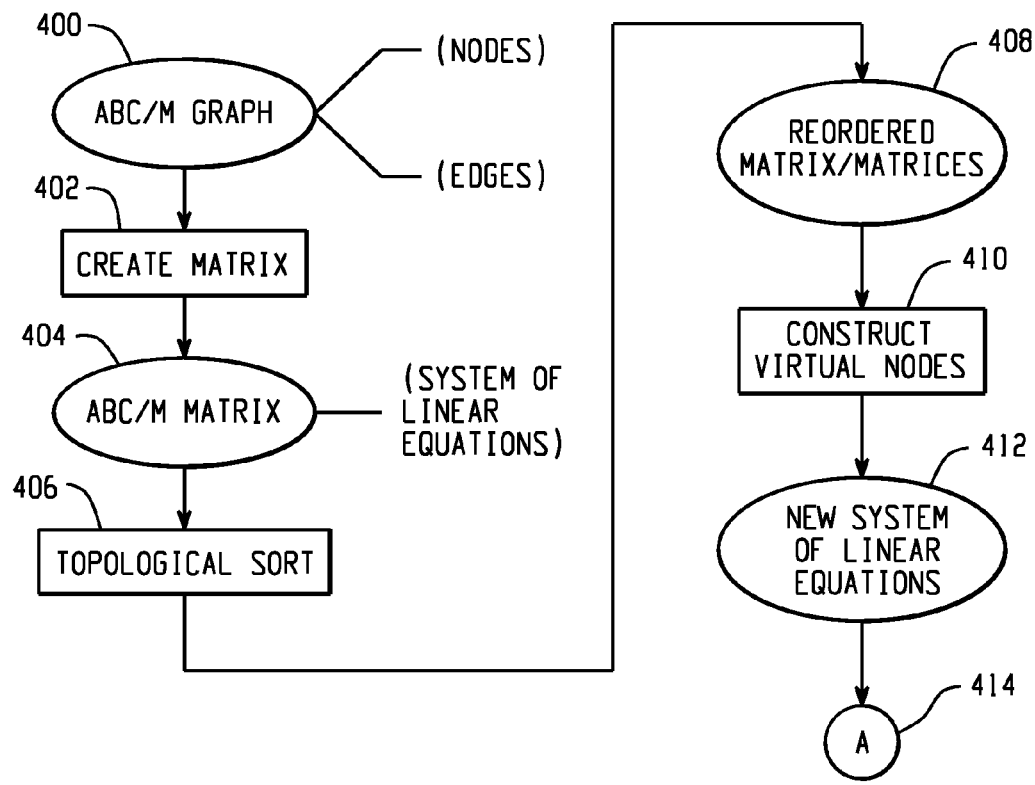
FIGS. 9 and 10 are flowcharts that depict another operational scenario for processing an ABC/M graph.

It should be understood that similar to the other processing flows described herein, the steps and the order of the steps in the flowchart described in FIG. 8 may be altered, modified, removed and/or augmented and still achieve the desired outcome. The operational scenario of FIG. 9 provides an example of this. FIG. 9 shows another operational scenario for processing an ABC/M graph 400. At step 402, a matrix 404 is created from the ABC/M graph 400. The matrix 404 is reordered at step 406 to generate reordered matrix(es) 408. The reordering is performed via a topological sort of the matrix 404 as follows:

$$PAP^T = \begin{bmatrix} L & 0 \\ S & M \end{bmatrix}$$

where P is a permutation matrix, A is the original ABC/M matrix, $P^T$ is the inverse permutation, L is a lower triangular matrix, M is a square matrix. Notice, L corresponds to the head acyclic portion of the graph.

After the reordering has been performed, virtual nodes are constructed if desired for solving a contribution problem. The virtual nodes are used for determining contribution amounts from one or more subsets of nodes to other subsets of nodes. In other words, given a prescribed flow on an arbitrary non-empty subset of nodes, the virtual nodes are used in determining how much of that money will contribute to (end up in) another arbitrary set of target nodes. The construction of virtual nodes results in a new system of linear equations 412 that represents the node aggregation performed at step 410. Processing continues on FIG. 10 as indicated by continuation marker 414.

Figure 10:
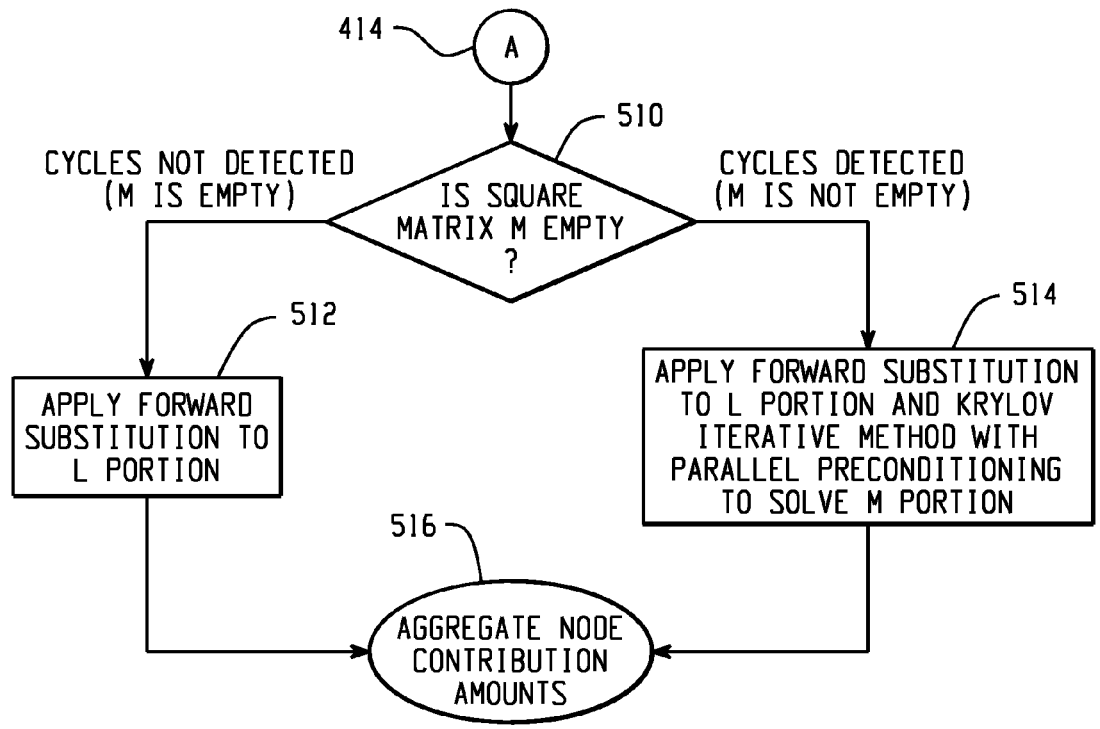

With reference to FIG. 10, the matrix containing the new system of linear equations is examined at decision step 510 to determine whether cycles are present. If cycles are detected (e.g., topological sort failed; hence cyclic M is present/not empty), step 514 applies forward substitution to compute $x_L$ components and applies a Krylov iterative approach with parallel preconditioning to solve for $x_M$, where $x=(x_L, x_M)$. If cycles are not detected, then forward substitution is applied at step 512 in order to determine the aggregate node contribution amounts 516.

It is noted that if a situation does not require a contribution system to be constructed (e.g., through step 504) and individual flow amounts on each node are only needed, then the above described process is modified in order to solve for x to obtain individual flow amounts on each node:

If M is empty (e.g., a directed acyclic graph, i.e., cycles are not present), then a forward substitution with either sparse or dense right-hand-sides is performed along with a Krylov iterative method.

If matrices L and M are both not empty, the forward substitution algorithm is necessary if "from" nodes are in L, it is sufficient if both "from" and "to" nodes are in L.

The Krylov iterative method is used to solve the M portion. The result is the determination of individual node contribution amounts as shown.

Figure 13:
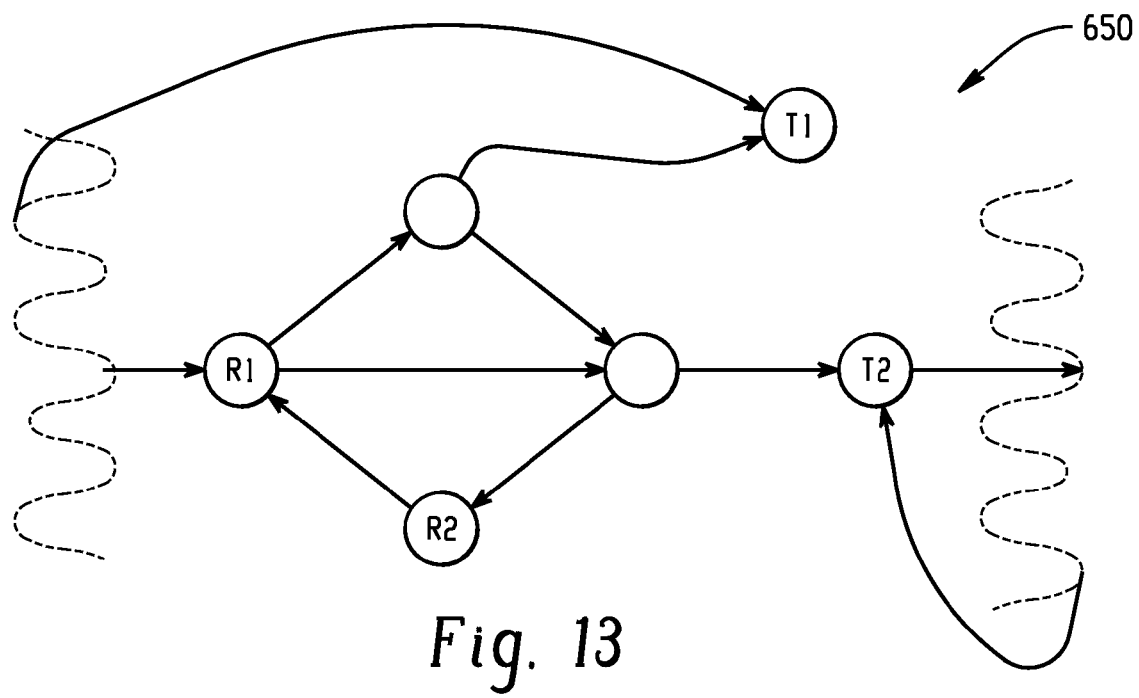
FIGS. 13 and 14 depict construction of virtual nodes.

With reference back to the contribution situation, an example of contribution system processing is as follows. Suppose we need to compute contribution from an arbitrary subset of nodes (e.g., nodes R1 and R2 that are shown at 650 on FIG. 13) into another arbitrary subset of target nodes (e.g., T1 and T2).

Figure 14:
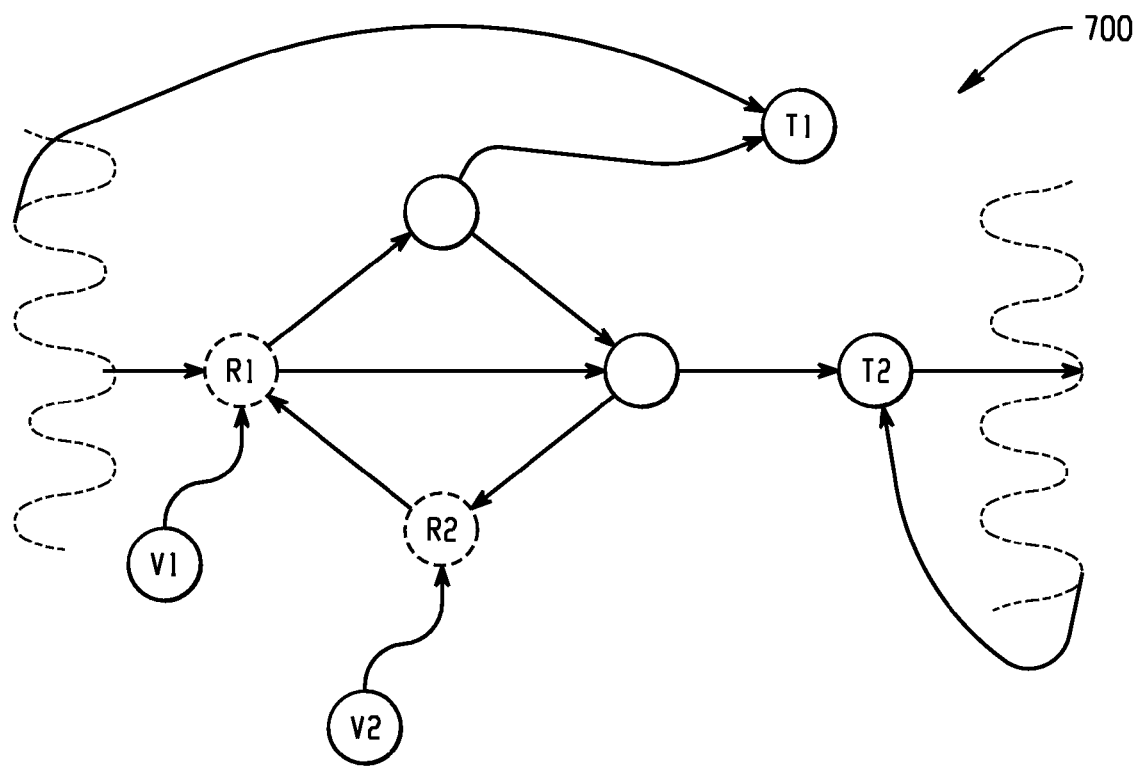

The first step in the contribution algorithm is to zero right-hand-sides so every flow on each node automatically becomes zero and introduce virtual nodes. This is shown as virtual nodes V1 and V2 at 700 on FIG. 14. From the solution of the initial system of linear equation we know the flow on all nodes, including R1 and R2.

Therefore we can "fix" and effectively eliminate R1 and R2 nodes from the system of linear equations (by transferring their contribution to the right hand side vector). However by zeroing out right-hand-sides we eliminated all "in-flow" into R1 and R2, thus making the network temporarily infeasible. By introducing virtual nodes not only do we restore the feasibility (e.g., virtual nodes compensate zero in-flow) but we ensure the correct amount of money on R1 and R2. Because there are no other contributors in the network we obtain the desired contribution by solving corresponding system of linear equations.

More specifically, suppose we are interested in solving contribution problem from an arbitrary non-empty set of from-nodes F:

$$F=\{F_1, \ldots, F_p\}$$

to an arbitrary set of to-nodes $T=\{T_1, \ldots, T_q\}$ (Notice, F and T are disjoint: $F \cap T=\emptyset$). For each node j from F we "fix" the resultant flow at $x^*_j$ (where $x^*$ is the solution to the original system of linear equations $Ax^*=b$) and introduce virtual nodes as new unknowns:

$$\sum_{j \notin F} a_{ij}x_j - v_i = -\sum_{j \in F} a_{ij}x^*_j, \forall i \in F$$

$$\sum_{j \notin F} a_{ij}x_j = -\sum_{j \in F} a_{ij}x^*_j, \forall i \notin F$$

Virtual nodes' solution values are effectively ignored, since their purpose is to maintain the correct in-flow for the from-nodes. With such an approach, all matrix transformations can be done in-place, without matrix reallocation.

An example of the processing performed in step 510 of FIG. 10 is as follows and presents a class of parallel preconditioners for L-dominant matrices and corresponding systems of linear equations:

$$Mx=b, M \in R^{n \times n}, x, b \in R^n$$

We can say matrix M is L-dominant (or U-dominant) if most of its nonzeros are located in lower (or upper) triangular portion of the matrix. Furthermore, we require the corresponding lower (or upper) triangular part to be nonsingular:

$$\prod_{i=1}^{n} m_{ii} \neq 0$$

Parallel algorithms for ABC/M matrices can be used, where typically 70% or more of nonzero coefficients are located in lower triangular factor.

Let us represent M as a sum of its lower L and strict upper triangular $U_S$ parts:

$$M = L + U_S$$

To rephrase, M is called L-dominant if $nonz(L) > nonz(U_S)$ and $det(L) \neq 0$. U-dominant case is similar $M = U + L_S$, $nonz(U) > nonz(L_S)$ and $det(U) \neq 0$.

Since ABC/M matrices (linear systems) are L-dominant, a $L^{-1}$ preconditioner (a single backward substitution) is performed in an iterative Krylov algorithm:

Let us partition L into four blocks as follows:

$$L = \begin{bmatrix} A & 0 \\ B & C \end{bmatrix}$$

where A and C are lower triangular sub-matrices. Notice, A and C are both nonsingular, since M is assumed to be L-dominant. To proceed further we need to establish an inverse triangular decomposition for $L^{-1}$, which wall play a fundamental role in constructing parallel preconditioners for ABC/M systems of linear equations:

The inverse of a lower triangular matrix L can be represented as follows:

$$\begin{bmatrix} A & 0 \\ B & C \end{bmatrix}^{-1} = \begin{bmatrix} I & 0 \\ 0 & C^{-1} \end{bmatrix} \begin{bmatrix} I & 0 \\ -B & I \end{bmatrix} \begin{bmatrix} A^{-1} & 0 \\ 0 & I \end{bmatrix}$$

Both, forward substitution (with either dense or sparse right-hand-sides) and the inverse triangular decomposition, require the same number of floating-point operations to solve $Lx=b$.

Indeed, a forward substitution $x=L^{-1}b$, which takes into account sparsity of the solution vector x requires:

$$\sum_{j \in supp(x)} (2nonz(l_j) - 1)$$

multiplications and additions, where $supp(x)=\{i: x_i \neq 0\}$ denotes support of x (the index set of nonzero vector coefficients) $l_j$ is j-th column of matrix L. (If L and x are dense, hence $nonz(l_j)=n-j+1$, the above expression results in well-known $n^2$.) The inverse triangular decomposition comprises two forward substitutions and one matrix-vector multiplication:

$$\sum_{j \in supp(x_A)} (2nonz(a_j) - 1) + \sum_{j \in supp(x_A)} 2nonz(b_j) + \sum_{j \in supp(x_C)} (2nonz(c_j) - 1) =$$

-continued $$\sum_{j \in supp(x_A)} (2\, nonz(l_j) - 1) + \sum_{j \in supp(x_C)} (2\, nonz(c_j) - 1) =$$

$$\sum_{j \in supp(x)} (2\, nonz(l_j) - 1)$$

where $x=(x_A, x_C)^T$ corresponding to L partitioning of x.

Similar result can also be established for a U-dominant matrix;

$$\begin{bmatrix} A & B \\ 0 & C \end{bmatrix}^{-1} = \begin{bmatrix} A^{-1} & 0 \\ 0 & I \end{bmatrix} \begin{bmatrix} I & -B \\ 0 & I \end{bmatrix} \begin{bmatrix} I & 0 \\ 0 & C^{-1} \end{bmatrix}$$

By virtue of the above, we observe that the bulk of sequential floating-point operations in either forward or backward substitutions can be at least partially reduced to matrix-vector product, which is trivially parallel.

Applying the same principle recursively we can further subdivide A and C matrices, and thus increase level of parallelism of $L^{-1}$ preconditioner. Another attractive aspect of this approach lies in the fact that the submatrices are kept "in-place." We do not need to explicitly extract or duplicate floating-point coefficients from the original matrix M.

The processing then considers how we shall partition the original matrix M. Let i denote a partition column, the first column of matrix C:

$$A \in R^{(i-1) \times (i-1)}, C \in R^{(n-i+1) \times (n-i+1)}, B \in R^{(n-i+1) \times (i-1)}$$

A partition column is selected, which will maximize the number of nonzero coefficients in B. Indeed, by maximizing nonz(B) we transfer the bulk of sequential forward substitution operations into a perfectly scalable/parallel matrix-vector multiplication. Let $nonz(l^k)$ denote the number of nonzero coefficients in row k of L, and $nonz(l_k)$ will denote the number of nonzero coefficients in column k of L. Hence our partitioning problem can be restated as follows:

$$\max_{i \in [2, \ldots, n]} nonz(L) - \sum_{k=1}^{i=1} nonz(l^k) - \sum_{k=i}^{n} nonz(l_k)$$

The above maximization can be reduced to a parallel enumeration of two integer n-component arrays; a very fast operation assuming compressed column and compressed row sparsity data structures are available (which is the case with ABC/M linear systems).

Figure 11:
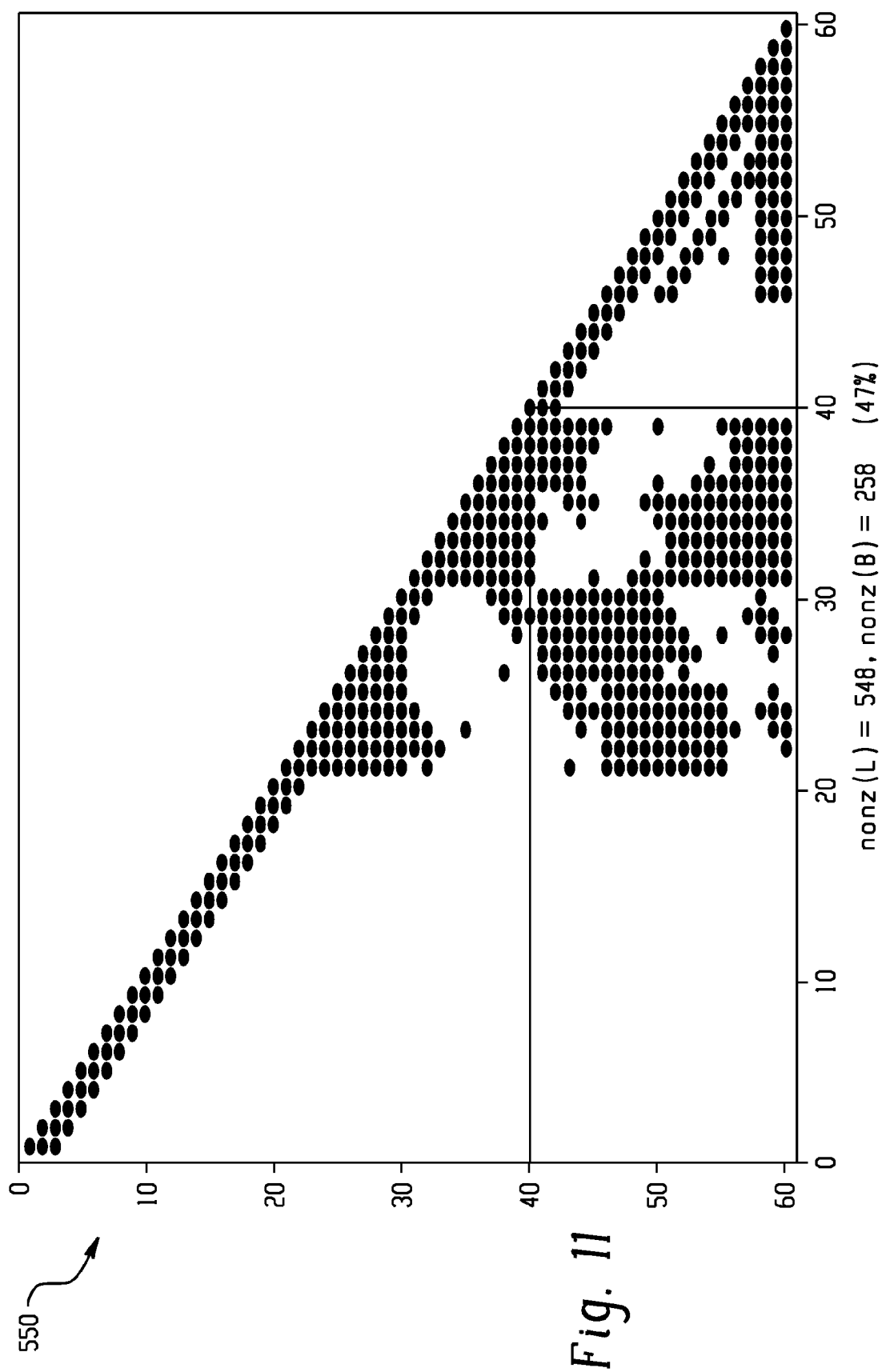
FIGS. 11 and 12 depict examples respectively of optimal 2-way and 4-way partitioning.
Figure 12:
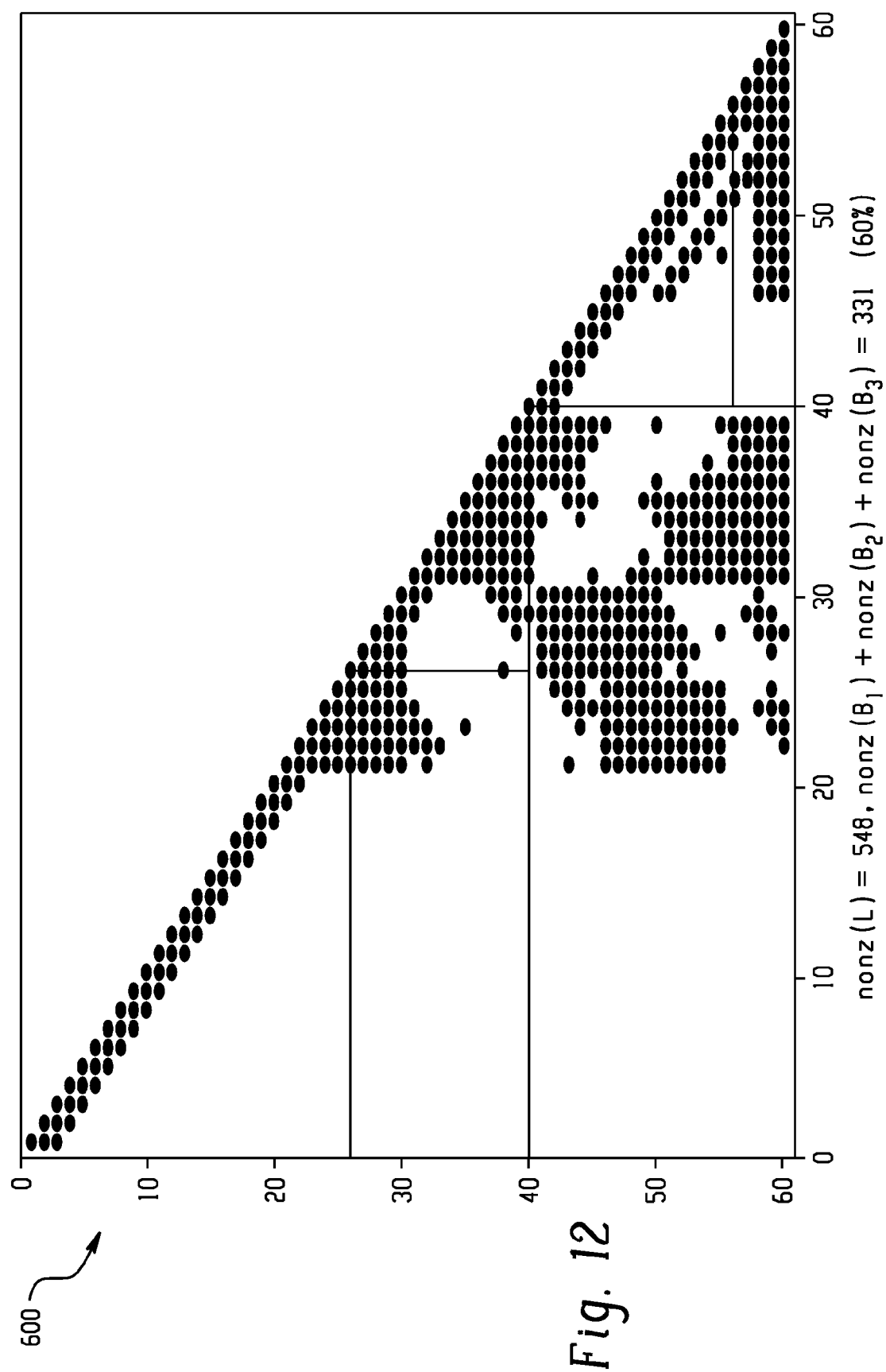

Examples of optimal 2 and 4-way partitions are respectively shown at 550 and 600 on FIGS. 11 and 12, wherein the abscissa (x-axis) corresponds to the matrix columns and the ordinate (y-axis) corresponds to the matrix rows. On graph 550 of FIG. 11, "nonz(L)=548" indicates the (total) number of nonzero coefficients in the L matrix; "nonz(B)" indicates the number of nonzero coefficients in the B matrix (which matrix was described above); and "47%", indicates that 47% of the L matrix nonzero coefficients can be processed in parallel while performing the corresponding forward substitution. On graph 600 of FIG. 12, "nonz(L)=548" indicates the (total) number of nonzero coefficients in the L matrix; "nonz(B1)+nonz(B2)+nonz(B3)=331" indicates the total number of nonzero coefficients in B1, B2, and B3 matrices; and "60%" indicates that 60% of the L matrix nonzero coefficients can be processed in parallel while performing the corresponding forward substitution.

Figure 15:
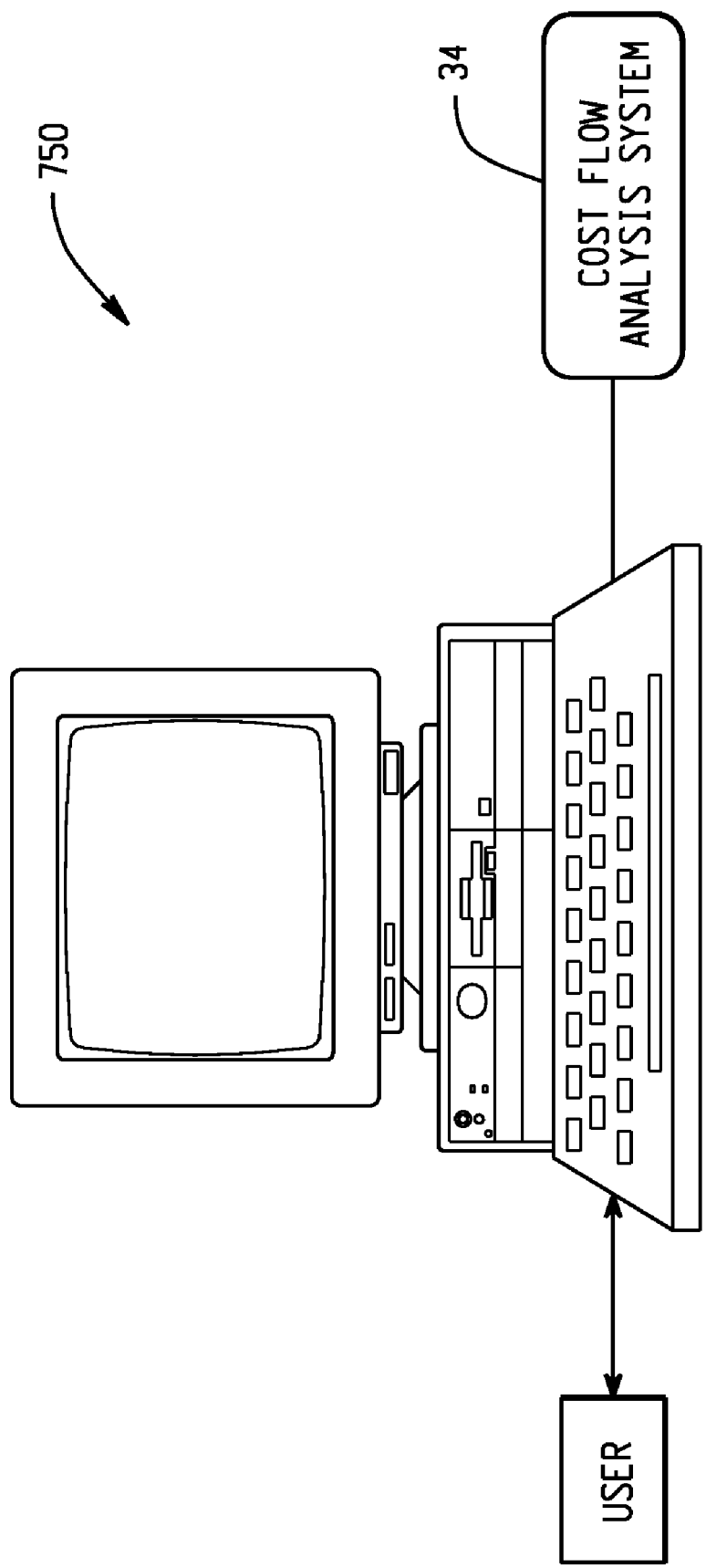
FIG. 15 is a block diagram depicting an environment wherein a user can interact with a cost flow analysis system.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a single general purpose computer or workstation (as shown at 750 on FIG. 15), or on a networked system, or in a client-server configuration, or in an application service provider configuration.

As another example of the wide scope of the systems and methods disclosed herein, a cost flow analysis system can be used with many different types of graphs. As an illustration, the entities of a graph can include resources, activities and cost objects (e.g., cost pools such as organizational cost pools, activity-based cost pools, process-based cost pools, other logical groupings of money, and combinations thereof).

The nodes of the graph can represent accounts associated with the resources, activities, or cost objects. In such a graph, an edge of the graph is associated with a percentage, which defines how much money flows from a source account to a destination account. The cost flow model depicts how money flows in the enterprise, starting from the resources to the activities, and finally, to the cost objects. The cost objects can represent products or services provided by the enterprise.

Such a graph can be relatively complex as it may include over 100,000 accounts and over 1,000,000 edges. This can arise when modeling the cost flow among service department accounts in one or more large companies. Examples of service departments include human resources department, an information technology department, a maintenance department, or an administrative department. In such a situation, a cost flow analysis system determines allocation of costs for the entities in the cost flow model, thereby allowing a user to establish a cost associated with operating each of the entities in the cost flow model. The allocation of costs may include budgeting, allocating expenses, allocating revenues, allocating profits, assigning capital, and combinations thereof.

It is further noted that the systems and methods may include data signals conveyed via networks (e.g., local area network, wide area network, internet, combinations thereof, etch), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for analyzing costs associated with a cost flow model, the method comprising:
receiving data associated with the cost flow model, wherein the cost flow model is associated with one or more entities, wherein each entity is represented by a node, and wherein the cost flow model identifies costs associated with relationships among the entities;
creating one or more matrices that are representative of the costs and the entity relationships, wherein the one or more matrices include one or more linear equations;
reordering, using one or more data processors, the one or more matrices using a topological sort;
constructing virtual nodes, wherein construction of the virtual nodes results in one or more modified linear equations; and
using one or more sparse matrix operations to solve the one or more modified linear equations, wherein the solutions to the modified linear equations are used to determine real-time activity based cost flow and cost contribution amounts among arbitrary subsets of the entities associated with the cost flow model.

2. The method of claim 1, wherein the cost flow model is an activity based cost flow model;
wherein the relationships are edges of the activity based cost flow model; and
wherein the entities are nodes of the activity based cost flow model.

3. The method of claim 2, wherein the activity based cost flows are determined in less than ten seconds.

4. The method of claim 2, wherein the activity based cost flow model is a forward contribution on a directed acyclic graph model.

5. The method of claim 2, wherein the activity based cost flow model is a reciprocal allocation model having cost cycles among two or more of the entities.

6. The method of claim 5, wherein at least one of the cost contribution amounts is inflated based on self-contribution through a cycle existing between two of the entities.

7. The method of claim 1, wherein the one or more sparse matrix operations include a sparse LU factorization operation or a Krylov iterative operation.

8. The method of claim 1, wherein the one or more matrices include a permutation matrix, an inverse permutation matrix, a lower triangular matrix, and a square matrix.

9. The method of claim 8, wherein the one or more matrices are represented in a data structure as:

$$PAP^T = \begin{bmatrix} L & 0 \\ S & M \end{bmatrix}$$

where P is a permutation matrix, A is original matrix of the cost flow model, $P^T$ is an inverse permutation matrix, L is a lower triangular matrix, and M is a square matrix.

10. The method of claim 9, wherein when the square matrix M is empty and $PAP^T=[L]$, a forward substitution is performed using either sparse or dense right-hand-side operations.

11. The method of claim 9, wherein the one or more sparse matrix operations comprise operations for which only non-zero components are stored.

12. The method of claim 2, wherein determining the cost contribution amounts is not dependent upon a number of relationships or a presence of reciprocal relationships among the entities of the cost flow model.

13. The method of claim 12, wherein determining the cost contribution amounts is dependent upon a number of entities and a number of edges present in the cost flow model.

14. The method of claim 1, wherein the entities include resources, activities and cost objects;
wherein the cost flow model is a multi-dimensional directed graph for depicting how money flows in an enterprise;
wherein nodes of the graph represent accounts associated with the resources, activities, or cost objects; and
wherein an edge of the graph is associated with a percentage, which defines how much money flows from a source account to a destination account.

15. The method of claim 14, wherein the cost flow model depicts how money flows in the enterprise from the resources to the activities to the cost objects.

16. The method of claim 14, wherein the resources represent accounts in a general ledger.

17. The method of claim 16, wherein the cost objects represent products or services provided by the enterprise.

18. The method of claim 1, wherein at least two of the entities comprise accounts associated with service departments.

19. The method of claim 18, wherein at least one of the service departments comprises a human resources department, an information technology department, a maintenance department, or an administrative department.

20. The method of claim 1, wherein the entities comprise cost pools.

21. The method of claim 20, wherein the cost pools include at least one of the group consisting of: organizational cost pools, activity-based cost pools, process-based cost pools, and combinations thereof.

22. The method of claim 1, further comprising:
storing the cost flow model in a relational database management system (RDBMS) or a multi-dimensional database (MDDB).

23. The method of claim 22, wherein the multi-dimensional database is an Online Analytical Processing (OLAP) database.

24. A computer-implemented system for analyzing costs associated with a cost flow model, comprising:
one or more processors;
a computer-readable memory containing instructions to cause the one or more processors to perform operations, including:
receiving data associated with the cost flow model, wherein the cost flow model is associated with one or more entities, wherein each entity is represented by a node, and wherein the cost flow model identifies costs associated with relationships among the entities;
creating one or more matrices that are representative of the costs and the entity relationships, wherein the one or more matrices include one or more linear equations;
reordering the one or more matrices using a topological sort;
constructing virtual nodes, wherein construction of the virtual nodes results in one or more modified linear equations; and
using one or more sparse matrix operations to solve the one or more modified linear equations, wherein the solutions to the modified linear equations are used to determine real-time activity based cost flow and cost contribution amounts among arbitrary subsets of the entities associated with the cost flow model.

25. A computer-readable storage medium encoded with instructions that cause a computer to perform a method for analyzing costs associated with a cost flow model, comprising:
receiving data associated with the cost flow model, wherein the cost flow model is associated with one or more entities, wherein each entity is represented by a node, and wherein the cost flow model identifies costs associated with relationships among the entities;
creating one or more matrices that are representative of the costs and the entity relationships, wherein the one or more matrices include one or more linear equations;
reordering the one or more matrices using a topological sort;
constructing virtual nodes, wherein construction of the virtual nodes results in one or more modified linear equations; and
using one or more sparse matrix operations to solve the one or more modified linear equations, wherein the solutions to the modified linear equations are used to determine real-time activity based cost flow and cost contribution amounts among arbitrary subsets of the entities associated with the cost flow model.

26. The method of claim 1, wherein the receiving, the creating, the constructing, and the using limitations are performed using one or more processors.

* * * * *